July 21, 1964  D. B. KAUFFELD  3,141,804
DIELECTRIC HEAT SEALING
Filed July 18, 1961
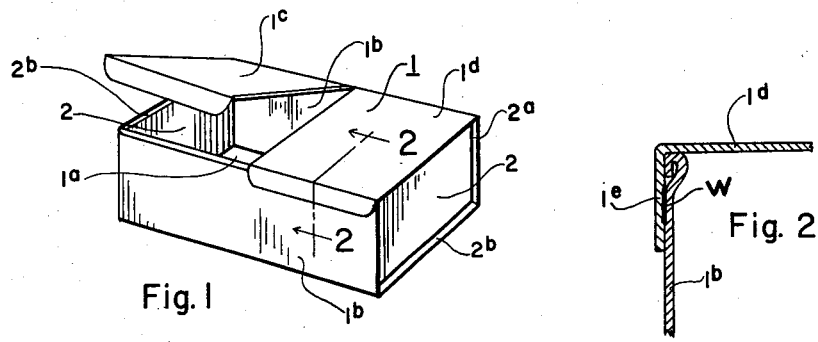
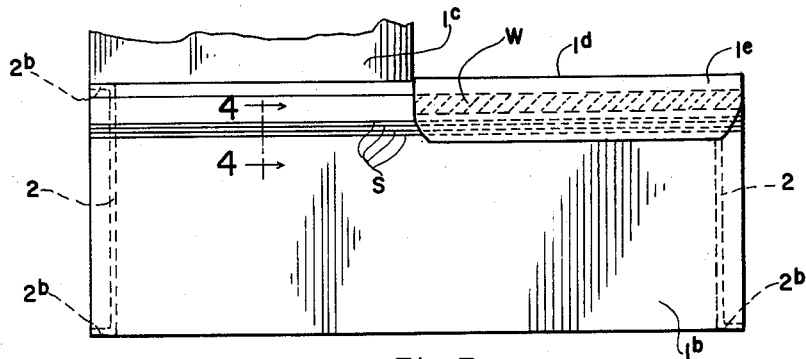
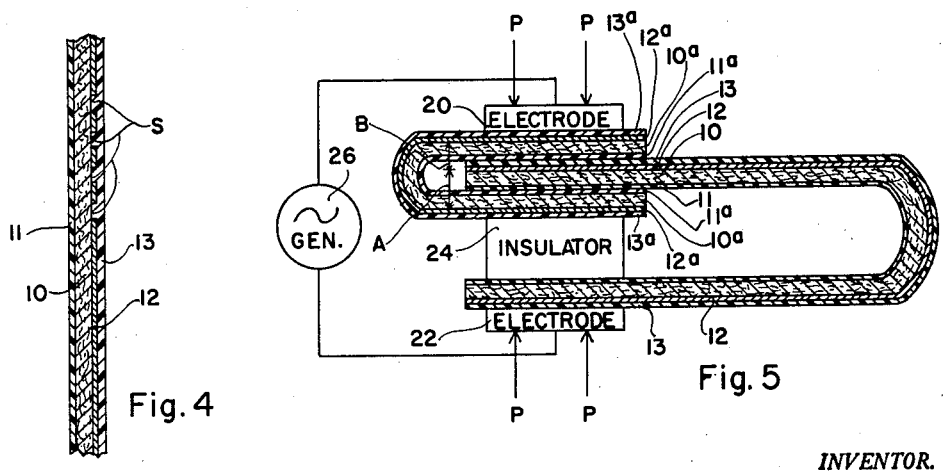
INVENTOR.
DON B. KAUFFELD
BY
Alexander & Dowell
ATTORNEYS

United States Patent Office 3,141,804
Patented July 21, 1964

3,141,804
DIELECTRIC HEAT SEALING
Don B. Kauffeld, Lexington, Ky., assignor to Foils Packaging Corporation, Cincinnati, Ohio, a corporation of Ohio
Filed July 18, 1961, Ser. No. 124,848
2 Claims. (Cl. 156—257)

This invention relates to the making of dielectric-heat-sealed containers and/or parts of containers from precut foil-clad paperboard blanks, and relates particularly to methods of heat-sealing such foil-clad parts together.

The prior art includes many teachings involving heat-sealing by fusing or welding together plastic materials to provide various types of sealed joints. The prior art also teaches the use of dielectric heating for joining together various parts to form containers or other items, but it has generally been considered that dielectric heating methods are not applicable to the sealing of foil-clad containers since the metal foil would normally be expected to shield or diffuse over too large a zone the applied electric field. Moreover, where separate foil layers or foil zones have the electric field applied thereacross, there is a strong tendency for arcing to occur therebetween when the radio frequency voltage thereacross is raised to a high enough amplitude to effect quick and efficient fusing or welding of the portions to be sealed together, and this tendency to arc has defeated past efforts to employ this type of electric heat-sealing.

It is the principal object of this invention to provide methods whereby dielectric-heat-sealing techniques can be efficiently used to seal together foil-clad cartons.

Still another object of the invention is to provide methods whereby the foil in different portions of the same blank can be isolated electrically from each other sufficiently to prevent arcing therebetween and thereby permit heat-sealing techniques to be successfully used to join those parts, while at the same time leaving the container parts with the general appearance of having continuous foil-clad surfaces.

The present methods include the steps of plastic coating the surface of the metal-clad blank with heat-sealable plastic having a high dielectric constant and having insulating properties which not only help discourage the tendency of the metal foil to arc, but also provide thermoplastic materials which can be fused together when dielectric-heated. Where two portions of the same metal-clad blank are to be sealed together, the metal foil on said portions can be separated and electrically isolated by a series of parallel narrow slits which sever the foil but do not cut into the paperboard appreciably. For instance, where the radio frequency voltage applied is about 3000 volts, four or five slits of approximately .010 inch width provide sufficient isolation, but do not unduly disturb the appearance of the metal-clad container if the slits are spaced apart, for instance, by about .020 inch. The foil when slit in this manner looks better than it would if it were separated by a single cut of .050 inch width.

Other objects and advantages of this invention will become apparent during the following discussion of the drawing, wherein:

FIG. 1 is a perspective view of a container which can conveniently be sealed by the present method;

FIG. 2 is a simplified and enlarged section view taken along line 2—2 of FIG. 1;

FIG. 3 is an enlarged and more detailed front view of the container shown in FIG. 1 and illustrating the structure before and after sealing;

FIG. 4 is an enlarged section view taken along line 4—4 of FIG. 3; and

FIG. 5 is a section view schematically illustrating a manner in which the present invention can be used to seal together foil-clad paperboard.

Referring now to the drawing, FIG. 1 illustrates a container 1 having a bottom 1a, longitudinal sides 1b, and closure flaps 1c and 1d, flap 1d remaining closed and sealed and the flap 1c being pulled open. Actually, when the container is first set up the flaps 1c and 1d are joined together along their common edge, and the paperboard is perforated in order to permit one side or the other of the container to be individually opened. The container also has end panels 2 comprising flat panels with outwardly extending flanges 2a and 2b, which flanges are heat-sealed to the walls of the container after the panel is recessed therein.

In FIG. 2, a clearer showing of the structure is provided illustrating the closure 1d sealed against the front panel 1b at a tear-up flap 1e, the sealing zone W being represented by a heavy black line. FIG. 2 is simplified to the extent that it shows only a general cross-section without showing the laminated structure of the material from which the container is constructed.

Actually, this material is not homogeneous, but by reference to FIG. 4 it will be seen that the material comprises a paperboard core 10 coated on one side with a plastic 11 and clad on the other side with a metal foil 12 secured to the paperboard core 10 by any suitable adhesive of which there are a number known in the prior art, for instance, a water base latex adhesive. The outer surface of the foil 12 is then coated with another plastic layer 13 for the purpose hereinafter discussed.

Referring now to FIG. 5, which serves to illustrate the method generally, the applicant has provided two paperboard laminates of the type generally shown in FIG. 4, and has bent one of the laminates around one end of the other laminate in such a manner that it is in contact with both surfaces thereof. For example, one laminate has a core 10, a plastic coating 11, a metal foil layer 12 and another plastic coating 13. The other laminate is similarly constructed and includes a paperboard core 10a, a plastic coating 11a, a metal foil 12a and another plastic layer 13a. In this example, the plastic layer 11a contacts both sides of the other board and therefore contacts at the lower surface of the other board the plastic layer 11, and at the upper surface of the other board it contacts the other plastic layer 13. These plastic layers 11 and 13 may or may not be the same type of plastic, since it is only necessary that one of the plastics be a heat-sealable plastic and that the other plastic be capable of binding therewith when the first plastic is fused.

One of the plastic coatings in this case can comprise a high-melting-point polyvinyl resin which also happens to be an inexpensive coating. In this event, the other plastic coating would have to be a weldable thermoplastic having a melting point below a temperature at which the paperboard core 10 would be damaged or the adhesive (not shown in the drawing) would be melted or damaged to such an extent as to cause delamination of the foil from the core. It is deemed desirable that the melting point of the thermoplastic be within a range of 200 to 350 degrees F. A suitable material for said weldable thermoplastic would be polyethylene which is pure-food approved and melts at around 215 degrees F. The polyvinyl resin has a melting point of about 450 degrees F., but will bond with the fused polyethylene quite satisfactorily at the lower temperature. Only sufficient pressure is required to prevent separation of the plastic surfaces during welding and before cooling of the seam below the fusion temperature. Besides the plastics already mentioned, namely polyvinyl resin and polyethylene, other satisfactory plastics include: a low-melting-point polyvinylidene chloride which melts at about 250 degrees F.;

and a higher-melting-point compound of polyester ethylene glycol and terephthalic acid which melts at about 500 degrees F. There are many others. The specific materials mentioned above are provided merely to illustrate a workable example but are not to be taken as limitations.

According to the present method, it is necessary to apply sufficient pressure to hold the materials in tight contact, and then to apply an electric field to stress the plastics to be fused. Referring to FIG. 5, it will be seen that the upper electrode 20 contacts the layer 13a, and that the lower electrode 22 contacts the layer 13. Each of these electrodes is separated from the respective metal foils 12 and 12a only by the thickness of these plastic coatings which are very thin. The paperboard core is about .005 inch thick, or thicker, and the plastic coatings are much thinner than the core. Therefore, the electrodes 20 and 22 are almost in contact with the foil, and since the surface areas of the electrodes are large, very close capacitive coupling will result between the electrodes and the coil. In other words, the electrode 20 is virtually directly connected with the foil 12a, and the electrode 22 is virtually directly connected with the foil 12. An insulator block 24 is placed between the plastic coating 13a and the coating 11 and serves merely as a spacer preventing welding of these two coatings together. A certain amount of mechanical pressure is then applied in the direction of the arrows P, in FIG. 5, in order to maintain the materials in close contact. A radio-frequency power generator 26 is then turned on and passes a radio frequency signal of high voltage amplitude to the electrodes so as to set up a strong electric field therebetween resulting in severe stressing of the atoms of the dielectric material at a radio frequency rate. Actually a frequency near the lower end of the very high frequency band has been found satisfactory, the experiments having been conducted principally at 30 megacycles.

Since the electrode 22 is coupled with the foil 12, the electric field is set up between the electrode 20 and the metal foil 12 which is located within the fold of the metal foil pieces 12a in the other piece of laminate. This means that a field is established between the foil 12 and the foil 12a in the vicinity of the arrow marked A in FIG. 5 and that another field is set up in the vicinity of the arrow B; and in each of these zones the plastic layers are in mutual contact. Assuming that the plastic 11a comprises a thermoplastic, it will be melted and bonded with the plastic 11 in the lower joint, within the field in the zone labeled A, and this same plastic coating 11a will also be melted in the vicinity of the upper joint in the zone labeled B and will therefore bond with the plastic layer 13.

Obviously, the field is more concentrated in the zone marked B than it is in the zone marked A because of the fact that the spacing between the adjacent metal foils acting as electrodes is smaller at B than it is at A. However, the continued application of the radio frequency signal beyond the time required to fuse the materials in zone B will result in fusion in zone A. The time differential is not very great.

According to actual tests, employing metal-clad paperboard of the type which would be desirable in making ice-cream cartons, the time of application of the current using a 4000-volt peak-to-peak amplitude at 30 megacycles was found to be less than two seconds. Note that the placement of the electrode 22 is quite remote from the location of actual welding in the zones A and B. This is possible because of the fact that the electrode need only be coupled with the metal foil, but need not be located in the immediate vicinity of the weld. This is a very fortunate condition as will appear presently.

Considering FIGS. 1 and 3 it will be seen that the end panels 2 have bent-out flanges 2a and 2b which lie along the paperboard sides 1b, 1d and 1a. A single electrode can therefore be abutted against the surface 2, and can be used in the welding of the flanges 2a and 2b to the abutting surfaces of the container simultaneously. The other electrode need only be abutted against some area of the container sides which is preferably adjacent the metal foil, and then all four flanges of an end panel 2 can be welded in place at the same time, provided means (not shown) is employed to clamp the flanges 2a and 2b against the container walls. This fact is illustrated by the generalized showing of FIG. 5 wherein the lower electrode 22 is placed remotely from the zone of actual welding.

FIGS. 3 and 4 serve to illustrate a special case in which portions of the same blank are to be welded together. For example, the front and rear panels 1b, the bottom panel 1a and the closures 1c and 1d as well as their front flanges are all one piece, and therefore the foil on all of these panels is electrically continuous. It follows then, that when the blank 1 is folded into the shape shown in FIGS. 1 and 3, the foil would tend to short-circuit the path between the two electrodes when an attempt is made to weld the tear flaps 1e to the front panel 1b, FIG. 2. In other words, when one electrode is placed inside of the folded-up blank 1 and another electrode is placed against the flange 1e in order to weld it shut in the weld area marked W, FIG. 3, it would be difficult to establish an electrical potential between the foil of the flange 1e and the foil in the vicinity of the weld area W on the front panel 1b since the foil of the bottom and rear panel and of the closure panels would short-circuit any potential applied thereto. This short-circuit effect might be overcome by applying a high enough amplitude to establish a high-voltage gradient, but this would be a wasteful and uncertain extreme. Instead, according to the present invention, a plurality of narrow slits 3 are cut across the front panel directly beneath the weld area W so as to break the continuous circuit from the foil in this area around the box and to the foil of the flange 1e. FIG. 4 illustrates these cuts in cross-section and shows how the foil is made discontinuous in the zones marked S by slitting and severing the foil therein. The widths of these slits have been found to be adequate if they are about .010 inch wide and if they are spaced apart by about .020 inch, four or five such slits sufficing. After the foil has been slit in this manner, the outer plastic coating 13 is applied so that it fills the space between the foil at the slits and acts as an insulator designed to discourage any tendency to arc across the slits. These slits therefore do not materially affect the ornamental appearance of the container, but at the same time adequately isolate the metal foil of the front panel in the vicinity of the weld zone W from the foil of the flange 1e. As stated above, an electrode can be placed inside of the carton under the weld area W and another electrode outside of the carton overlying the flange 1e in the vicinity of the weld area W, and this combination of electrodes can be used to seal the flanges against the front panel very efficiently.

The applicant presents the following data merely for the purpose of showing an actual example based on experiences performed.

Paperboard—.016 inch thick.
Aluminum foil applied by latex water base adhesive.
Plastic coating 13 adjacent the foil—.001 inch.
Plastic coating 11 against the paperboard—.001 inch.
Thickness of paperboard—.016 inch.
Thickness of plastic coatings—.002 inch.
Area of weld—7⅞ sq. inches.
Radio frequency—30 megacycles.
  First example: 3000 volts amplitude for two seconds.
  Second example: 2000 volts amplitude for three seconds.
Contact pressure—100 pounds per square inch.

The present invention is not to be limited to the precise methods discussed and illustrated, for obviously changes may be made within the scope of the following claims.

I claim:
1. The method of making a dielectric-heat-sealed container part from a single foil-clad paperboard blank including the following steps: cutting a series of parallel narrow slits through the foil between portions of the blank to be sealed together; coating the surfaces of the blank with heat-sealable plastic; bringing together the said portions of the blank; applying pressure thereacross; and coupling radio frequency to the foils located on opposite sides of said series of slits to establish an electric field therebetween to fuse together the plastic on abutting surfaces within said field.

2. The method as set forth in claim 1, wherein said radio frequency is substantially in the very-high-frequency range and said slits comprise at least two slits about .010 inch wide and separated by about .020 inch.

References Cited in the file of this patent
UNITED STATES PATENTS

| | | |
|---|---|---|
| 2,429,255 | Ashley | Oct. 21, 1947 |
| 2,542,702 | Prows | Feb. 20, 1951 |
| 2,700,634 | Ackerlind | Jan. 25, 1955 |

OTHER REFERENCES

Neumann, J. A., and Bockhoff, F. J.: Welding of Plastics, N.Y., Reinhold Publishing Corp., 1959, pages 124–125.